UNITED STATES PATENT OFFICE.

NAPOLEON PETINOT, OF NEW YORK, N. Y., ASSIGNOR TO UNITED STATES FERRO-ALLOYS CORPORATION, OF NEW YORK, N. Y., A CORPORATION OF NEW YORK.

PROCESS FOR PRODUCING ALLOYS CONTAINING ZIRCONIUM CARBID.

1,335,983. Specification of Letters Patent. Patented Apr. 6, 1920.

No Drawing. Application filed August 18, 1919. Serial No. 318,326.

*To all whom it may concern:*

Be it known that I, NAPOLEON PETINOT, a citizen of the United States, residing in the city of New York, county of New York, and State of New York, have invented certain new and useful Improvements in Processes for Producing Alloys Containing Zirconium Carbid, of which the following is a full, clear, and exact description.

This invention relates to a method of manufacturing ferro-zirconium containing zirconium carbid and comprises a novel method by which that result is obtained.

I have found that in manufacturing special grades of steel containing from 0.5 to 20 per cent. zirconium that considerable difficulty is experienced owing to the fact that when ferro-zirconium is added to the molten steel, for the purpose of making the zirconium steel, a large amount of the zirconium is oxidized.

To overcome this difficulty I use a ferro-zirconium containing carbid of zirconium or a double carbid of iron and zirconium containing from 5% to 50% zirconium and 1% to 8% carbon and it is the method of making this ferro alloy which I desire to patent.

In carrying out my invention I use a mixture of zirconium oxid, as, for example, baddeleyite with scrap iron and carbon in excess of the amount required by the following equation:

$$ZrO_2 + 2C = Zr + 2CO$$

This mixture is smelted in an electric furnace of the Siemens type, for example, which is lined with carbon or zirconia bricks. In general it is not necessary to add any slag or slag forming materials to the charge for the zirconium ore contains enough impurities for this purpose, but if there are not enough slag forming constituents in the ore, or if, for the example, the ore contains an excess of silica, I may add lime or other suitable material to form an artificial fusible slag. When the smelting is complete, the furnace contains a metallic bath of ferro-zirconium containing a double carbid of iron and zirconium covered with a protective slag formed from the impurities of the ore. The next step in the operation is to chill this metallic bath rapidly so as to prevent changing the combined carbon to the free graphitic form and for this purpose the metal is poured from the furnace into chilled molds. When cold it may be broken into small pieces.

In this manner and by varying the mixture used in the furnace the content of zirconium carbid in the alloy is varied from 10% to 40% by weight of the whole though alloys containing as little as 2% and as high as 75% zirconium carbid may be used.

A chemical examination of the product as formed will disclose that the alloy is made up of homogeneously, conglomerate, minute particles of the carbid of zirconium and iron.

Having thus described my invention, what I claim is:

1. A process of making iron alloys containing zirconium carbid or a double carbid of iron and zirconium which consists in smelting a mixture of zirconium ore, iron and carbon and then rapidly cooling the molten metal.

2. A process of making iron alloys containing zirconium carbid or a double carbid of iron and zirconium which consists in smelting a mixture of baddeleyite, an excess of carbon and scrap iron and then rapidly chilling the molten, metallic mass.

3. A process of making iron alloys containing zirconium carbid or a double carbid of iron and zirconium which consists in forming a mixture of zirconium oxid, carbon and iron, then placing the mixture in an electric furnace having a carbon lining until it is smelted and then rapidly chilling the molten, metallic mass.

4. A process of making iron alloys containing zirconium carbid or a double carbid of iron and zirconium which consists in forming a mixture containing from 5% to 50% of zirconium, from 1% to 8% of carbon and from 94% to 42% of iron and rapidly chilling the molten, metallic mass.

5. A process of making iron alloys containing zirconium carbid or a double carbid of iron and zirconium which consists in smelting a mixture of baddeleyite, an excess of carbon and scrap iron and then rapidly chilling the molten, metallic mass by tapping it into a chilled mold.

6. A process of making iron alloys containing zirconium carbid or a double carbid of iron and zirconium which consists in smelting a mixture of zirconium ore, iron and carbon then adding to the molten, metallic bath an artificial, fusible slag and then rapidly chilling the molten metal.

7. A process of making iron alloys containing zirconium carbid or a double carbid of iron and zirconium which consists in smelting a mixture of zirconium ore, iron and carbid then adding to the molten, metallic bath lime and then rapidly chilling the molten metal.

In testimony whereof I have hereunto signed my name.

NAPOLEON PETINOT.